(12) United States Patent
Barmeier et al.

(10) Patent No.: US 10,724,805 B2
(45) Date of Patent: Jul. 28, 2020

(54) CHARGING SYSTEM WITH A HIGH TEMPERATURE THERMAL ENERGY EXCHANGE SYSTEM AND METHOD FOR CHARGING HEAT STORAGE MATERIAL OF THE HIGH TEMPERATURE THERMAL ENERGY EXCHANGE SYSTEM WITH THERMAL ENERGY

(71) Applicant: Siemens Gamesa Renewable Energy A/S, Brande (DK)

(72) Inventors: Till Andreas Barmeier, Hamburg (DE); Volker Seidel, Pansdorf (DE); Henrik Stiesdal, Odense C (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 165 days.

(21) Appl. No.: 15/504,456

(22) PCT Filed: Mar. 20, 2015

(86) PCT No.: PCT/EP2015/055958
§ 371 (c)(1),
(2) Date: Feb. 16, 2017

(87) PCT Pub. No.: WO2016/050369
PCT Pub. Date: Apr. 7, 2016

(65) Prior Publication Data
US 2017/0261268 A1     Sep. 14, 2017

(30) Foreign Application Priority Data
Sep. 30, 2014   (EP) ..................................... 14187085

(51) Int. Cl.
*F28D 17/00*   (2006.01)
*F01K 3/00*    (2006.01)
(Continued)

(52) U.S. Cl.
CPC .............. *F28D 17/005* (2013.01); *F01K 3/00* (2013.01); *F28D 20/0056* (2013.01); *F28D 20/02* (2013.01); *Y02E 60/145* (2013.01)

(58) Field of Classification Search
CPC ... G16H 15/00; F28D 17/005; F28D 20/0056; F28D 20/02; F01K 3/00; Y02E 60/145; B60K 15/03504
(Continued)

(56) References Cited

U.S. PATENT DOCUMENTS

2002/0074273 A1*  6/2002  Golovatai-Schmidt ......................
                                                    B01D 35/02
                                                    210/130
2010/0218500 A1    9/2010  Ruer
(Continued)

FOREIGN PATENT DOCUMENTS

CN      102575908 A     7/2012
EP       2698505 A1     2/2014
(Continued)

OTHER PUBLICATIONS

International Search Report and Written Opinion for PCT Application No. PCT/EP2015/055958, dated Oct. 26, 2015; 11 pgs.

*Primary Examiner* — Davis D Hwu
(74) *Attorney, Agent, or Firm* — Schmeiser, Olsen & Watts LLP

(57) ABSTRACT

A charging system with a least one high temperature thermal energy exchange system is provided. The high temperature thermal energy exchange system includes at least one heat exchange chamber with chamber boundaries which surround at least one chamber interior of the heat exchange chamber, wherein the chamber boundaries include at least one inlet opening for guiding in an inflow of at least one heat transfer fluid into the chamber interior and at least one outlet opening for guiding out an outflow of the heat transfer fluid (Continued)

out of the chamber interior. At least one heat storage material is arranged in the heat exchange chamber interior such that a heat exchange flow of the heat transfer fluid through the heat exchange chamber interior causes a heat exchange between the heat storage material and the heat transfer fluid.

24 Claims, 10 Drawing Sheets

(51) Int. Cl.
*F28D 20/02* (2006.01)
*F28D 20/00* (2006.01)

(58) Field of Classification Search
USPC .......................................................... 165/10
See application file for complete search history.

(56) References Cited

U.S. PATENT DOCUMENTS

| | | |
|---|---|---|
| 2011/0247592 A1* | 10/2011 | Kim ................. B60K 15/03504 |
| | | 123/519 |
| 2012/0055661 A1 | 3/2012 | Feher |
| 2012/0168111 A1 | 7/2012 | Soukhojak |
| 2013/0231946 A1* | 9/2013 | Shibuya ................. G16H 15/00 |
| | | 705/2 |
| 2013/0232946 A1* | 9/2013 | Hamrin ..................... F02C 3/22 |
| | | 60/39.465 |

FOREIGN PATENT DOCUMENTS

| | | |
|---|---|---|
| FR | 2965341 A1 | 3/2012 |
| WO | WO 2012007196 A2 | 1/2012 |
| WO | WO2013026993 A1 | 2/2013 |

\* cited by examiner

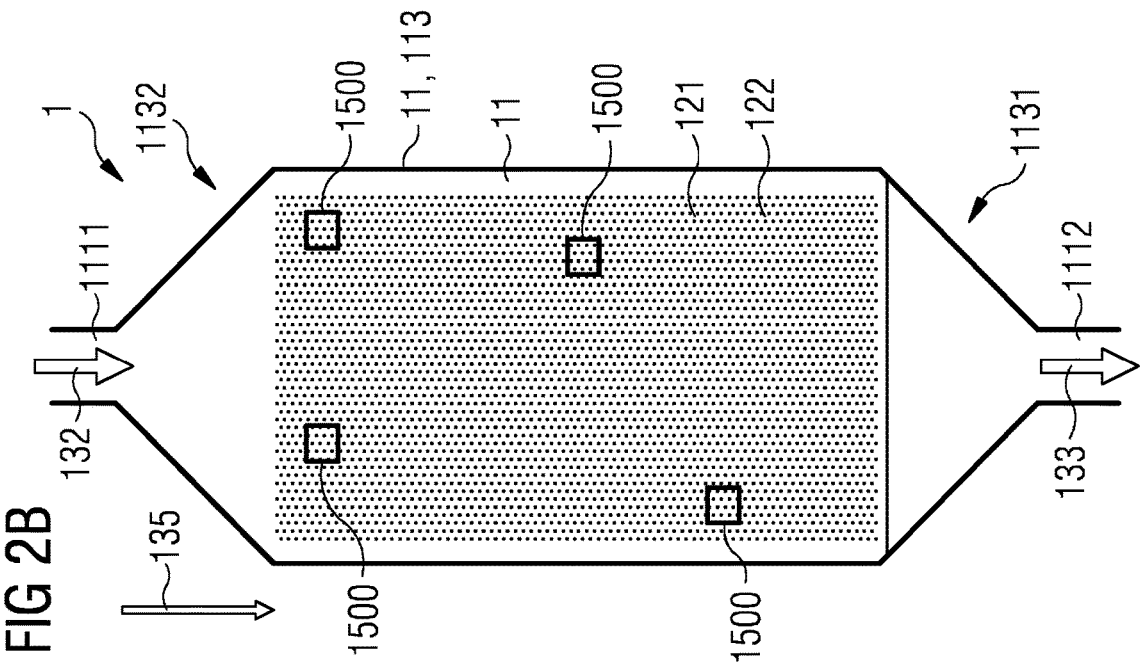
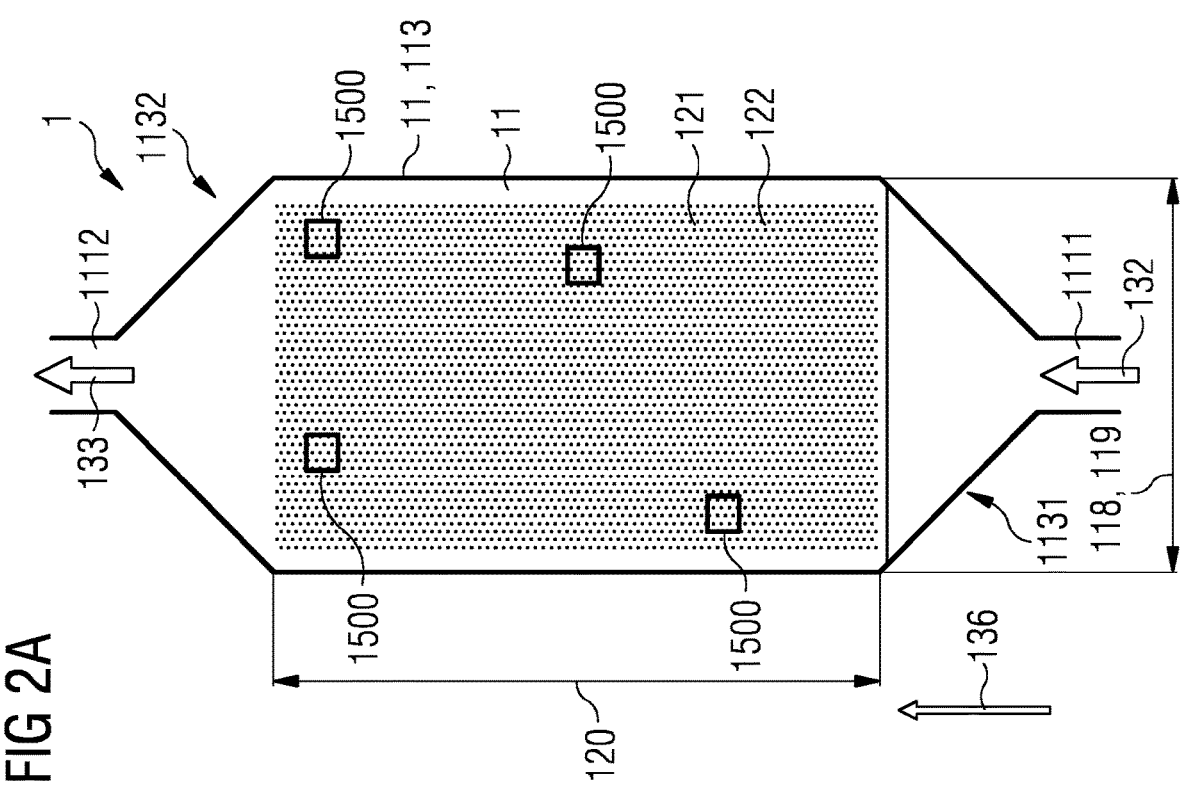

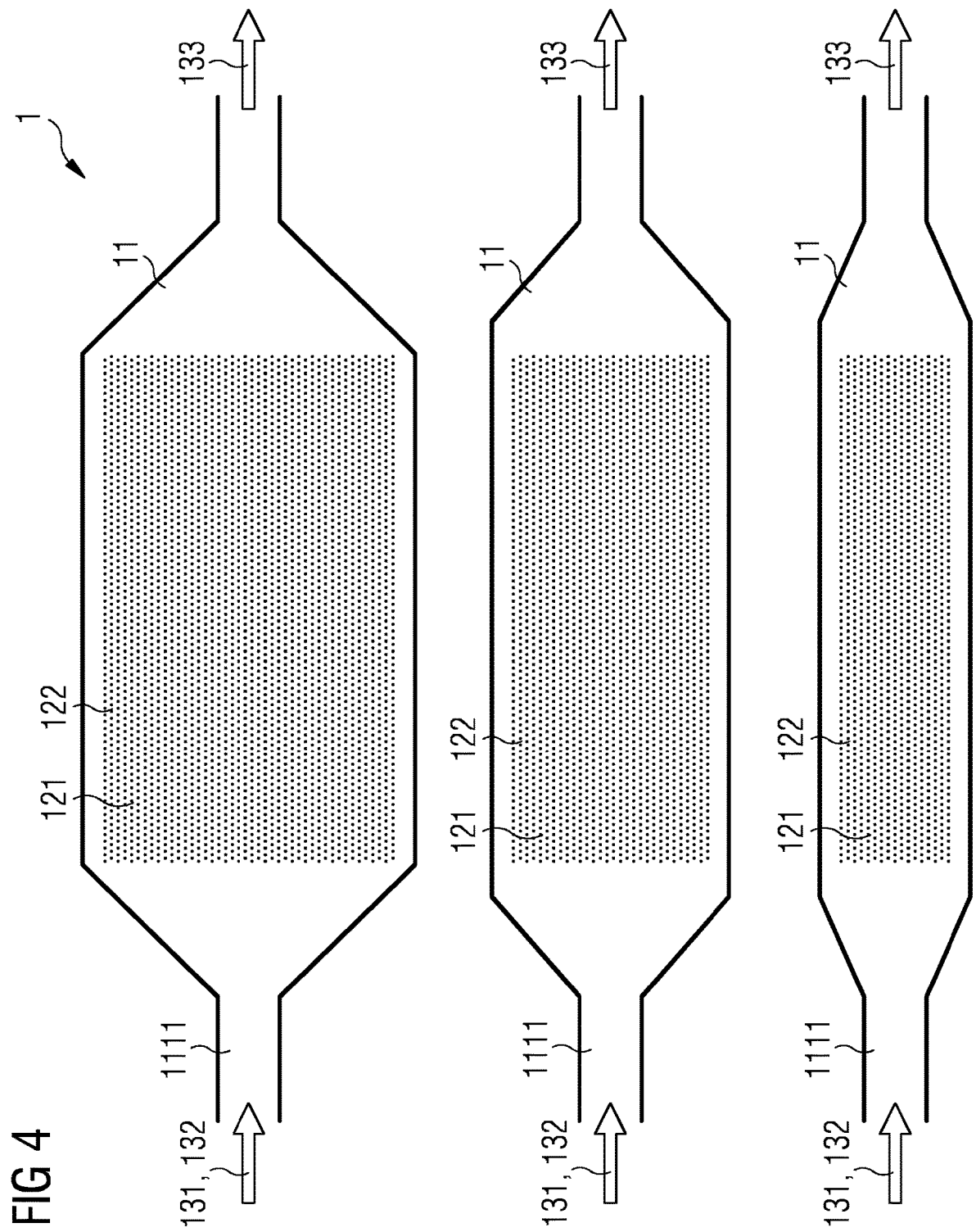

CHARGING SYSTEM WITH A HIGH TEMPERATURE THERMAL ENERGY EXCHANGE SYSTEM AND METHOD FOR CHARGING HEAT STORAGE MATERIAL OF THE HIGH TEMPERATURE THERMAL ENERGY EXCHANGE SYSTEM WITH THERMAL ENERGY

CROSS-REFERENCE TO RELATED APPLICATIONS

This application claims priority to PCT Application No. PCT/EP2015/055958, having a filing date of Mar. 20, 2015, based off of EP Application No. 14187085.7 having a filing date of Sep. 30, 2014, the entire contents of which are hereby incorporated by reference.

FIELD OF TECHNOLOGY

The following refers to a charging system with a high temperature thermal energy exchange system and a method for charging heat storage material of the high temperature thermal energy exchange system with thermal energy.

BACKGROUND

Despite the integration of renewable energy into the public electric energy system (power grid) a large share of electricity is nowadays still generated by fossil energy sources. But the global climate change requires the further development of renewable energies.

The energy output of renewable energy sources like wind and solar is not constant throughout a day or throughout a year. Consequently, electricity which is generated by utilizing energy from renewable energy sources fluctuates.

In order to handle this fluctuating electricity energy storage units are developed. Such energy storage units are a) mechanical storage units e.g. pumped hydro storage, compressed air storage or flywheels, (b) chemical energy storage units e.g. storage of hydrogen, batteries and organic molecular storage, (c) magnetic energy storage units, and (d) thermal energy storage units with water or molten salts.

However, only pumped hydro storage is already today well-established and matured as a large scale energy storage technology. All other storage technologies are lacking capability to store electric energy at low cost, whereas pumped hydro storage is geographically limited to certain regions (sufficient geodetic heights).

SUMMARY

An aspect relates to an efficient solution for storing (absorbing) energy.

A charging system with a least one high temperature thermal energy exchange system is provided. The high temperature thermal energy exchange system comprises at least one heat exchange chamber with chamber boundaries which surround at least one chamber interior of the heat exchange chamber, wherein the chamber boundaries comprise at least one inlet opening for guiding in an inflow of at least one heat transfer fluid into the chamber interior and at least one outlet opening for guiding out an outflow of the heat transfer fluid out of the chamber interior. At least one heat storage material is arranged in the heat exchange chamber interior such that a heat exchange flow of the heat transfer fluid through the heat exchange chamber interior causes a heat exchange between the heat storage material and the heat transfer fluid. The charging system is equipped with at least one charging unit for heating the heat transfer fluid of the inflow. The heat is thermal energy. The inflow of the heat transfer fluid into the heat exchange chamber and the outflow of the heat transfer fluid out of the heat exchange chamber result in the heat exchange flow of the heat transfer fluid through the heat exchange chamber interior.

In addition to the charging system with the high temperature thermal energy exchange system, a method for charging the heat storage material of the charging system with thermal energy is provided. Thereby, in a charging mode of the high temperature thermal energy exchange system a heat transfer fluid is guided through the heat exchange chamber interior. By that, a charging (heating) of the heat transfer material with thermal energy is caused. During the charging mode a heat transfer from the heat transfer fluid to the heat storage material takes place.

The charging unit is arranged such that an efficient heat transfer to the heat transfer fluid of the inflow is possible. In order to minimize loss of thermal energy, the charging unit is preferably arranged at the inlet opening (near by the inlet opening).

Preferably, the charging unit comprises at least one electrical heating device which is selected from the group consisting of resistance heater, inductive heater, emitter of electromagnetic radiation and heat pump. The electromagnetic radiation is preferably infrared radiation. With the aid of the resistance heater thermal energy is produced and transferred to the heat transfer fluid (via direct contact, convection or radiation). Thereby, the electrical heating can be driven with electricity originating from renewable energy sources. Preferably, the resistance heater or a number of resistance heaters are located in the heat exchange flow. Preferably, the resistance heater comprises a large heat exchange area for an efficient heat exchange from the resistance heater to the heat transfer fluid. For instance, a large heat exchange surface is formed by a grid of the resistance heaters. A meander shaped resistance heater is possible, too. With such a measure, the heat transfer to the heat transfer fluid is improved. In addition, the possibility of unwanted occurrence of hot spots is reduced.

The heat exchange surface of the resistance heater is located in the inflow of the heat transfer fluid whereas control units and/or propulsion units of the resistance heater are located outside of the inflow. Preferably, such a unit is located at a respective cold area of the high temperature thermal energy exchange system or outside a pipe or channel system that guides the inflow.

A combination of different electrical heating devices is possible. Alternatively or in addition, a heating up of the heat transfer fluid with the aid of waste energy or combustion heat is possible, too.

The charging system comprises preferably means for removing particles from the inflow of the heat transfer fluid. Such means are filters or cyclones. The removing of particles serves the purpose of efficient heat transfer, avoid cloaking and avoid possible fires.

The heat exchange chamber is a space, cavity, excavation or a housing in which the heat storage material is located. Within the heat exchange chamber the heat exchange takes place. In order to provide an efficient heat exchange, the heat exchange chamber is preferably thermally insulated against the surroundings. The loss of thermal energy is reduced by the thermal insulation.

The heat transfer fluid is guided (led) into the heat exchange chamber interior via the inlet opening and is guided out of the heat exchange chamber interior via the outlet opening. There is an inlet area of the chamber boundary with the inlet opening and there is an outlet area of the chamber boundary with the outlet opening.

For the guiding of the heat transfer fluid into the heat exchange chamber and for the guiding of the heat transfer fluid out of the heat exchange chamber a pipe system (or channel system, ducting system) is used. This pipe system can be closed (with a closed loop) or can be open (with an open loop). For instance the heat transfer fluid is ambient (air of the environment). The loop is an open loop. Air from the environment is introduced into the heat exchange system and air of the heat exchange system is released to the surroundings. There is an air exchange during the operation of the heat exchange system. In contrast to that, there is no air exchange or a selectively adjustable air exchange during the operation in a closed loop. This has following specific advantage: In a situation with an almost completely charged heat storage material, heat transfer fluid with remaining heat is released to the environment in an open loop. The remaining heat is lost. In contrast to that, in a closed loop this heat transfer fluid with remaining heat stays in the heat exchange system. The remaining heat is not lost. Therefore, in a preferred embodiment, a closed loop is implemented and wherein the inflow comprises the outflow. The outflow is guided back to the inlet opening.

The charging system is operated in the charging mode. The charged high temperature thermal energy exchange system can be discharged again. For discharging the high temperature thermal energy exchange system, it is operated in a discharging mode. In a preferred embodiment, the high temperature thermal energy exchange system is equipped with at least one discharging unit for discharging heat of the heat transfer fluid in the outflow for electricity production. Thermal energy is released and is transformed into electricity. The thermal energy is especially used for driving of a water/steam cycle.

In order to increase the flexibility the steam cycle of fossil fired power plants (or nuclear power plants, etc.) can be combined with the high temperature thermal energy exchange system proposed here. Either the installed equipment is solely used to generate electrical energy with the stored thermal energy in a heat recovery process like in CCPP (combined cycle power plant) or the high temperature thermal energy exchange system is used to increase the flexibility of a thermal power plant. In the latter case the boiler is operated with fuel when fuel costs are lower than electricity costs and the storage is charged if electricity prices are low. Charging can take place during a period of excess production of energy.

The discharging mode can be realized when electricity prices and demand are high or when the production of renewable energies is low. Well suited are CCPP since their heat recovery steam generator (HRSG) is similar to the application proposed here. Nevertheless, hard coal, oil, gas, waste incineration, wood or lignite fired power plants can be used since the heater device can be designed for high temperature to match the temperatures used in the steam generator. In a hybrid mode the fuel can be used to increase the temperature from the temperature level of the storage to the operating temperature of the original furnace or boiler design.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposite to each other (countercurrent). But, a change of the directions of the heat exchange flow is not necessary. Charging mode direction and discharging mode direction comprise the same direction (co-current). In a different operational use the main flow direction of the heat transfer fluid is the same for the charging mode and the discharging mode.

In countercurrent operation, switching from the charging mode to the discharging mode the direction of the exchange flow through the heat exchange chamber interior is reversed and consequently, the function of the openings (inlet opening, outlet opening) as well as a relative temperature (cold or hot) at the opening is reversed, too. With such a solution it is especially advantageous to use the same heat transfer fluid for the charging mode and for the discharging mode. But of course, different heat transfer fluids for the charging mode and the discharging mode can be used, too.

The high temperature thermal energy exchange system is especially adapted for operation at high temperatures. Therefore, in a preferred embodiment, an operating temperature of the operating mode is selected from the range between 300° C. and 1000° C., preferably selected from the range between 500° C. and 1000° C., more preferably selected from the range between 600° C. and 1000° C., 650° C. to 1000° C. and most preferably between 700° C. and 1000° C. A deviation of the temperature ranges is possible. In this context, very advantageous is an upper limit of the temperature range of 900° C. and most preferably an upper limit of the temperature range of 800° C.

The heat storage material can be liquid and/or solid. For instance, a core of the heat storage material is solid and a coating of this solid core is liquid. Such a liquid coating can comprise ionic liquid.

The solid material comprises preferably bulk material. Mixtures of different liquid materials and different solid materials are possible as well as mixtures of liquid and solid materials.

It is possible that the heat storage material is a thermochemical energy storage material: Energy can be stored via an endothermic reaction whereas energy can be released via an exothermic reaction. Such a thermo chemical storage is for instance the calcium oxide/calcium hydroxide system. These heat storage materials can be arranged in specific containers out of non-reactive container material. Non-reactive means that no chemical reaction between the heat storage material and the container material takes place during the heat exchange process.

Moreover, a complex high temperature thermal exchange system with different heat exchange chambers with different heat storage materials and/or different heat transfer fluids is possible, too. For Instance, a thermal exchange unit with stones as heat storage material and a thermal exchange unit with a phase change material as a heat storage material are combined together.

In a preferred embodiment, the heat storage material comprises at least one chemically and/or physically stable material. In the range of the operational temperature the heat storage material does not change its physical and/or chemical properties. A physically stable material does not change its physical properties during the heat exchange. For instance, the heat storage material remains in a solid state in the operating temperature range. A chemically stable material does not change its chemical composition during the heat exchange. For instance, such a chemically stable material is a phase change material (PCM).

In a preferred embodiment, the heat storage material comprises sand and/or stones. The stones can be natural stones or artificial stones. Mixtures thereof are possible, too. Artificial stones can consist of containers which are filled with heat storage material. This heat storage material is for instance a phase-change material or a thermo-chemical storage material (see above).

Preferably, the stones comprise gravels (pebbles), rubbles and/or grit (splits). The artificial material comprises preferably clinkers or ceramics. Again, mixtures of the mentioned materials are possible, too.

In order to provide a cheap energy storage material it is advantageous to use waste material. Therefore, in a preferred embodiment, the artificial material comprises at least on by-product of an industrial process. For instance, the by-product is iron silicate. Iron silicate origins from a slag of copper production.

In a preferred embodiment, heat exchange channels are embedded in the heat storage material for guiding of the heat exchange flow through the heat exchange chamber interior. The heat storage material forms a heat exchange bed. The heat exchange bed comprises the heat exchange channels. The heat exchange channels are embedded into the heat storage bed such that the heat exchange flow of the heat transfer fluid through the heat exchange channels causes the heat exchange between the heat storage material and the heat transfer fluid. The heat exchange channels can be formed by interspaces (gaps) of the heat storage material. For instance, the heat storage material comprises stones. The stones form the heat exchange bed with the heat exchange channels. In addition or alternatively, the heat storage material is porous. Open pores of the heat storage material form the heat exchange channels.

In a preferred embodiment, the high temperature thermal energy exchange system is equipped with at least one flow adjusting element for adjusting the heat exchange flow of the heat transfer fluid through the heat exchange chamber interior, the inflow of the heat transfer fluid into the heat exchange chamber interior and/or the outflow of the heat transfer fluid out of the heat exchange chamber interior. With the aid of the flow adjusting element it is possible to adjust a temperature distribution in the heat exchange chamber interior and within the heat storage material respectively. The use of a number of flow adjusting elements is advantageous for a fine tuning of the heat exchange flow and consequently for a fine tuning of the temperature distribution in the heat storage material.

Preferably, the flow adjusting element comprises at least one active fluid motion device (with a corresponding software system) which is selected from the group consisting of blower, fan and pump and/or the flow adjusting element comprises at least one passive fluid control device which is selected from the group consisting of activatable bypass pipe, nozzle, flap and valve. A multitude of these devices are possible as well as a combination of these devices. With the aid of such devices the heat exchange flow can be modified such that the heat exchange occurs efficiently. In addition, flow adjusting elements can be arranged serially or in parallel. For instance, two flaps are arranged at two inlet openings in order to adjust the inflows of the heat transfer fluid into the heat exchange chamber and consequently in order to adjust the temperature distribution in the heat exchange chamber.

The flow adjusting element is arranged in the heat exchange chamber, downstream of the heat exchange chamber and/or upstream of the heat exchange chamber.

In the context of the active fluid motion devices it is advantageous that driving units of the active fluid motion devices like electric motors and electrical equipment are located outside of the (possibly very hot) heat exchange flow.

The special advantage of passive control devices is that they are cheap. In addition, passive control devices are very reliable.

The heat exchange chamber is a vertical heat exchange chamber and/or a horizontal heat exchange chamber.

The term "horizontal heat exchange chamber" implies a horizontal main (average) flow of the heat transfer fluid through the heat exchange chamber interior. The flow direction of the horizontal main flow is essentially parallel to the average surface of the earth. The horizontal direction is essentially a perpendicular direction to the direction of the gravity force which affects the heat transfer fluid. Perpendicular means in this context that deviations from the perpendicularity of up to 20° and preferably deviations of up to 10° are possible.

A horizontally oriented direction of the heat exchange flow can be achieved by lateral inlet openings and/or lateral outlet openings. The horizontal heat exchange chamber comprises these openings in its side chamber boundaries. In addition, with the aid of an active fluid motion control device like a blower or a pump the heat exchange flow in the heat exchange chamber interior is caused. The heat transfer fluid is blown or pumped into the heat exchange chamber interior or is pumped or sucked out of the heat exchange chamber interior.

In contrast to the term "horizontal heat exchange chamber", the term "vertical heat exchange chamber" implies a vertical main flow of the heat transfer fluid through the heat exchange chamber interior. For instance, the operating mode is the charging mode. In a vertical heat exchange chamber the heat exchange flow is preferably directed downwards (top down) during the charging mode. The vertical main flow (essentially parallel but in the opposite direction to the direction of gravity force) can be caused by an active fluid motion device (blower or pump). The inlet opening is located at a top of the heat exchange chamber and the outlet opening is located at a bottom of the heat exchange chamber.

Based on natural convection, in a vertical heat exchange chamber the temperature of the heat storage material along a cross section perpendicular to the flow direction of the heat transfer fluid is approximately the same (horizontal isothermal lines).

In contrast to that, in a horizontal heat exchange chamber due to natural convection the temperature of the heat storage material along the cross section perpendicular to the flow direction of the heat transfer fluid (see below) can differ (inclined isothermal lines).

It has to be noted that the terms "horizontal" and "vertical" are independent from the dimensions of the heat exchange chamber and its orientation. Decisive is the direction of the flow of the heat transfer fluid through the heat exchange chamber interior. For instance, a "horizontal heat exchange chamber" can have a chamber length which is less than the chamber height of the heat exchange chamber.

Besides pure vertical and horizontal heat exchange chambers, a mixture of "vertical heat exchange chamber" and "horizontal heat exchange chamber" is possible, too. In such a heat exchange chamber, the main flow of the heat transfer fluid is the result of horizontal and vertical movement of the heat transfer fluid through the heat exchange chamber interior.

In a preferred embodiment, at least two inlet openings are arranged vertically to each other and/or at least two outlet openings are arranged vertically to each other. Openings are arranged above each other. By this measure it is possible to influence a vertical distribution of heat exchange flows in order to improve a temperature distribution (temperature front) in the heat storage material and heat exchange chamber interior respectively. Isothermal lines perpendicular to the flow direction are influenced.

The temperature front is defined by neighboring cold and hot areas of the heat storage material in the heat exchange chamber interior caused by the flow of the heat transfer fluid through the heat exchange chamber interior. The temperature front is aligned perpendicular to the respective flow direction of the heat exchange flow through the heat exchange chamber. During the charging mode the heat exchange flow is directed in a charging mode direction wherein the temperature front moves along this charging mode direction. In contrast to that, during the discharging mode the heat exchange flow is directed in the discharging mode direction (opposite to the charging mode direction) wherein the temperature front moves along the discharging mode direction. In both cases, the temperature front of the heat exchange chamber is migrating through the heat exchange chamber to the respective hot/cold ends of the heat exchange chamber. It is to be noted that in case of countercurrent operation, the hot (hot opening) end remains the hot end (hot opening), independently from the mode (charging or discharging mode).

The temperature front is a zone of strong temperature gradient in the heat storage material, i.e. high temperature difference between hot and cold areas. In this application it separates the hot (charged with thermal energy) and the cold (not charged) zone in the heat exchange chamber within the heat storage material. The temperature front develops due to the transfer of thermal energy from the heat transfer fluid to the heat storage material during charging and from the heat storage material to the heat transfer fluid during discharging. Isothermal zones/lines develop ideally (e.g. without the influence of gravitation) perpendicular to the main flow direction, i.e. zones/lines of constant temperature.

In order to optimize the efficiency of the high temperature thermal energy exchange system it is advantageous to ensure a uniform temperature front. There are just small variations concerning the temperature gradients perpendicular to the flow direction. In a vertical heat exchange chamber with a flow direction top down, the temperature front is nearly uniform due to natural convection. So, in this case additional measures are not necessary. In contrast to that, natural convection leads to a non-uniform temperature front in a horizontal heat exchange chamber. So, in this case additional measures could be meaningful (like usage of more openings or usage of more flow adjusting elements).

Preferably, the chamber boundary with one of the openings comprises a transition area with a tapering profile such that an opening diameter of the opening aligns to a first tapering profile diameter of the tapering profile and a chamber diameter of the heat exchange chamber aligns to a second tapering profile diameter of the tapering profile. The transition area comprises an increasing cross section from the respective opening towards the heat exchange chamber. This is especially advantageous for the inlet opening. The diameter of the transition area expands from the opening diameter of the inlet opening to the diameter of the chamber opening. With the aid of the tapering profile the inflow of the heat transfer fluid is guided into the heat exchange chamber interior. The guided inflow is distributed to a wide area of heat storage material. By this measure a capacity of the heat exchange unit (heat storage material which is located in the heat exchange chamber) can be highly exploited. In addition, the efficiency of the heat exchange can be improved by adapting the heat exchange flow. Remark: For additionally adapting the heat exchange flow, a diffuser can be located at the inlet opening, especially in the transition area. By means of the diffuser an incident flow of the heat transfer fluid into the heat exchange chamber can be adjusted. For instance, such a diffuser is formed by stones which are located in the transition area with the tapering profile.

For the case that the heat exchange chamber comprises a number of inlet openings it is very advantageous to arrange a described transition area in at least one of the inlet openings. Preferably, a number of inlet openings or every inlet opening comprises its individual transition area.

The transition area with the outlet opening can be tapered, too: A tapering of the chamber opening to the outlet opening is implemented. By this measure the guiding of heat flow out of the interior of the heat exchange chamber is simplified.

In a configuration where the flow direction of charging and discharging are opposite the tapering of the transition area at the inlet opening and the tapering of the transition area at the outlet opening ensure a desired flow distribution of the heat transfer fluid in both operating modes.

In this context the use of a short transition area is very advantageous. For instance, the short transition area comprises a dimension which is less than 50% of a heat exchange chamber length. For instance, the dimension is about 20% of the heat exchange chamber length. The length is the heat exchange chamber dimension that is parallel to the main flow direction of the heat transfer fluid through the heat exchange chamber. But of course, the dimension of the transition area is dependent on a number of features of the complete system, e.g. temperature of the heat transfer fluid, mass flow of the heat exchange flow, speed of the heat exchange flow at the relevant opening, etc.

In order to save space and in order to reduce the surface-volume ratio for a reduced heat loss, it is advantageous to implement a transition area as short as possible. The result is a short transition channel for guiding the inflow into the heat exchange chamber interior. Besides an efficient usage of the capacity of the heat exchange chamber a low space requirement is connected to this solution.

Preferably, the heat exchange chamber comprises a cylindrically shaped chamber boundary. For instance, the chamber boundary which comprises the inlet opening is formed as a circular cylinder and/or the chamber boundary with the outlet opening is formed as a circular cylinder. Such shapes lead to best surface-volume ratios.

The heat transfer fluid is selected from the group consisting of a liquid and a gas. The gas is selected from the group consisting of inorganic gas and/or organic gas. The inorganic gas is preferably air. Mixtures of different liquids are possible as well as mixtures of different gases.

Preferably, the heat transfer fluid comprises a gas at ambient gas pressure. Preferably, the gas at the ambient pressure is air. The ambient pressure (900 hPa to 1.100 hPa) varies such that the heat exchange flow through the heat exchange chamber interior is caused.

In a preferred embodiment, the high temperature thermal energy exchange system is equipped with at least one measuring device for determining a charge status of the high temperature thermal energy exchange system. Preferably, the mentioned measuring device for determining a charge status of the high temperature thermal energy exchange system is a thermocouple. The thermocouple is a temperature measuring device which is based on the Seebeck effect. Alternatively, the temperature measuring device is based on electrical resistance.

For instance, the charge status of the high temperature heat exchange system comprises the degree of the charging of the heat storage material with heat. With the aid of the measured charge status the operating mode (charging mode or discharging mode) can be monitored. Information about the charge status can be used for the process control of the operating modes. The charge status or state of charge refers to the energy content of the high temperature thermal exchange system which is related to the temperature of the heat storage material. If a large share of the heat storage material comprises a high temperature the state of charge or charge status is higher than if a small share of the heat storage materials at a high temperature.

In this context it is advantageous to use a number of such measuring devices. Preferably, these measuring devices are distributed over the heat exchange chamber.

The heat exchange chamber can comprise large dimensions. Preferably, a length of the heat exchange chamber is selected from the range between 20 m-250 m, a width of the heat exchange chamber is selected from the range between 20 m-250 m and a height of heat exchange chamber is selected from the range of 10 m-60 m.

For the charging cycle and/or for the discharging cycle the heat exchange system comprises preferably a particle filter or other means to remove particles from the heat transfer fluid, for instance a cyclone particle remove system. The removing of particles servers the purpose of efficient heat transfer, avoid deposition of the particles, avoid cloaking and avoid possible fires. It is possible to use this filter device just for commissioning purposes. In this case, after the initial operation the filter device is removed.

The following specific advantages are achieved:

With the aid of the charging system with the high temperature thermal energy exchange system energy can be stored and can be released efficiently.

With the aid of a charging unit with an electrical heating device very high temperatures of the heat transfer fluid are available.

Thermal energy can be stored and can be released efficiently. Excess electricity is used for the charging mode. Excess electricity is transformed into thermal energy which is stored. During the discharging mode thermal energy is transformed into electricity with the aid of a water steam cycle. This transformation is very efficient due to high temperatures provided by high temperature thermal energy exchange system. Electricity from the discharge mode is available during periods of high electricity consumption and high demand (of consumers or of the energy market).

Usually, the location of production of electricity with the aid from renewable energy sources such as onshore and offshore wind does not coincide with the region of high power consumption. Weak grid node points can cause a grid overload since they were designed for a constant base load and not for fluctuating renewable energy. The excess energy that exceeds the capacity of the grid can reach up to 20%. In this case the renewable energy sources have to be curtailed or even shutdown. With embodiments of the invention, an efficient storage of the excess electricity is possible.

Thermal energy on a high temperature level can be stored over a long period of time. The hit temperature thermal energy exchange system could deliver heat for more than 10 hours up to 10 days. The high temperature level in this kind of storages can be more than 600° C. and it can be directly used for reconversion in a water steam cycle. The electrification of the stored thermal energy via the water steam cycle does not depend on fuel like gas or coal and hence it is $CO_2$ emission free.

The high temperature thermal energy exchange system offers a higher energy density compared to other storage technologies. This means that more energy can be stored in a smaller volume. In addition, bulk heat storage materials are much cheaper and cost effective than molten salts or phase change materials which are currently developed.

Due to high temperatures an additional heating up for subsequent electrification processes, e.g. additional heating up of steam of a water/steam cycle is not necessary.

The used heat storage materials are simple and regionally available natural products like basalt stones. By-products and waste materials from industrial processes e.g. iron silicate slag from copper production are possible storage materials as well. This reduces the costs and causes short transport distances.

The high temperature thermal energy exchange system can be operated under ambient pressure (heat transfer fluid at ambient pressure). So, there is no need for installing pressure units in view of the heat transfer fluid. It is easier to reach a necessary reliability of the high temperature thermal energy exchange system. In addition, high pressure units would be expensive.

The stored thermal energy could be used for ORC (Organic Rankine Cycle) power plants. These power plants operate at relatively low operating temperatures. But preferably, the stored thermal energy is used for steam power plants. Due to the high load capacity and the high possible operating temperatures of the high temperature thermal energy exchange system the working fluid (steam) of the steam power plant can be operated at high temperatures (steam parameter). This results in a high efficiency of the steam cycle of the steam power plant.

Preferably, the high temperature thermal energy exchange system comprises a pipe system with compensation units (e.g. expansion joints) for balancing different thermal induced dimension changes (thermal dynamic loads). Thermal mismatch does not result in a damage of the pipe system. This leads to a high reliability. Alternatively or in addition, the pipe system comprises thermally insulated components, like channels which are insulated from the inside.

The charging system can be combined with conventional power plants, e.g. a coal power plant. The shutdown of such a power plant and the subsequent start of the power plant are expensive. With the aid of the charging system it is possible to avoid the shutdown and start of the power plant.

Generally, there is a wide use of the high temperature thermal energy exchange system for this high quality heat. It is useable not only for water steam cycles, it can also be used for industrial or power plant processes or for district heating or for industrial steam.

In addition, the charging system can be used as a discharging system, too. "Cold" heat transfer fluid with a low amount of thermal energy is guided through the heat exchange chamber interior. Thereby, a heat transfer from the heat storage material to the heat transfer fluid takes place.

BRIEF DESCRIPTION

Some of the embodiments will be described in detail, with reference to the following figures, wherein like designations denote like members, wherein:

FIG. 2A shows an embodiment of a vertical heat exchange chamber in a discharging mode;

FIG. 2B shows an embodiment of the vertical heat exchange chamber of FIG. 2A in a charging mode;

FIG. 4 shows another embodiment of a horizontal heat exchange chamber;

Figure 8:
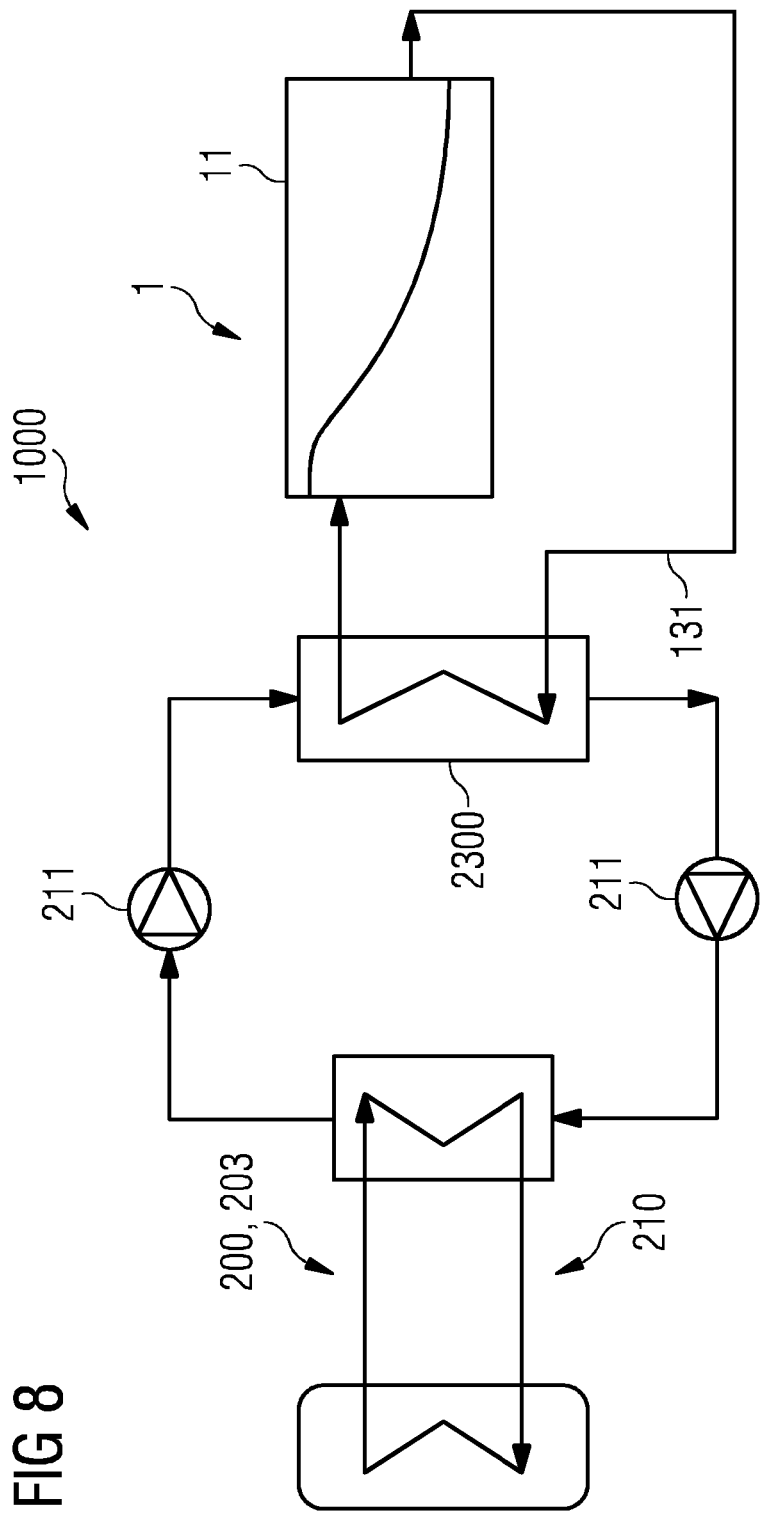
Figure 9:
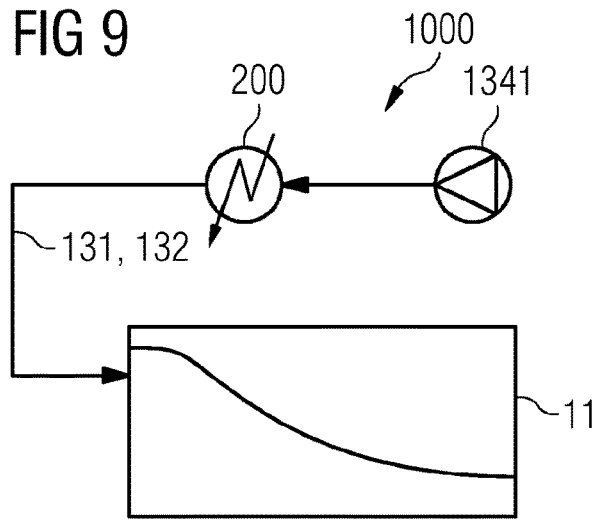
Figure 10:
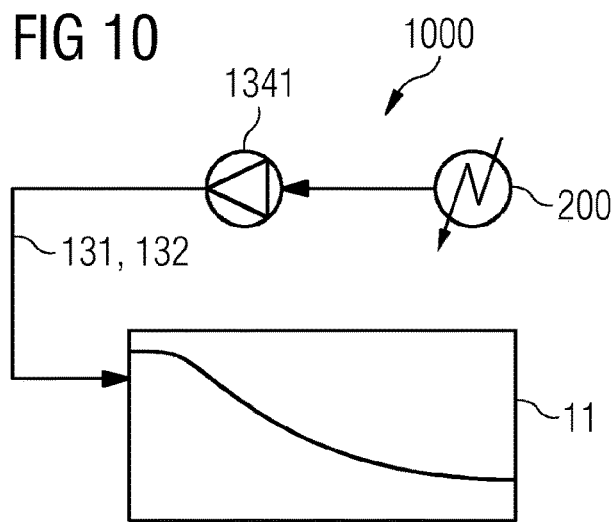
Figure 11:
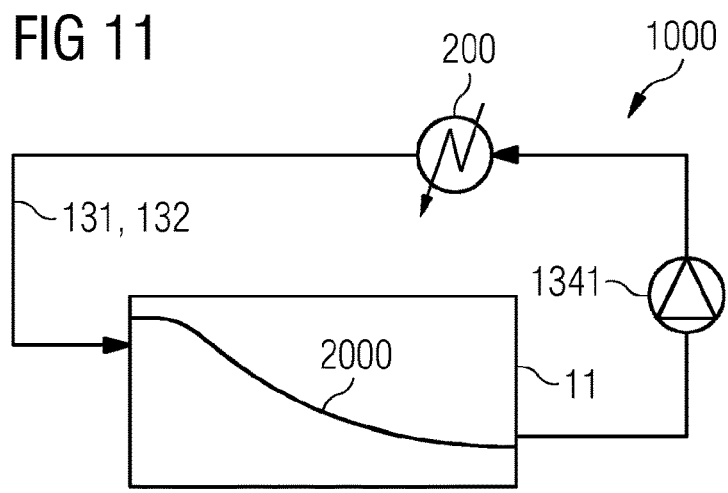
Figure 12:
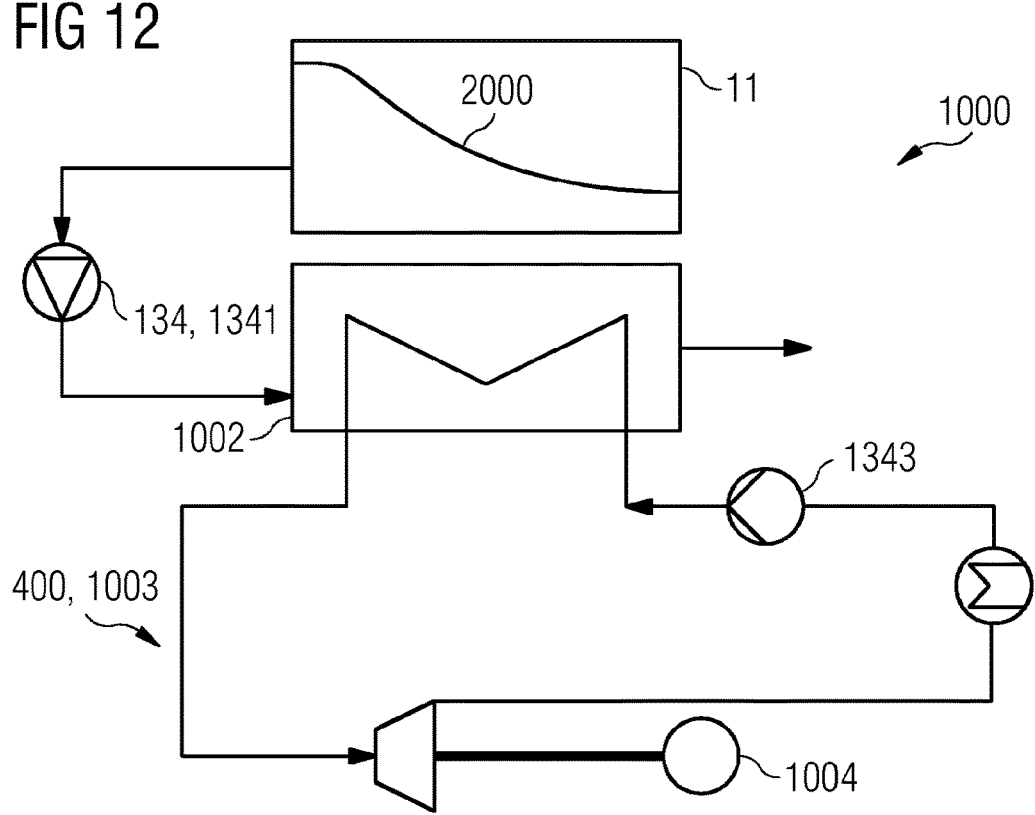
Figure 13:
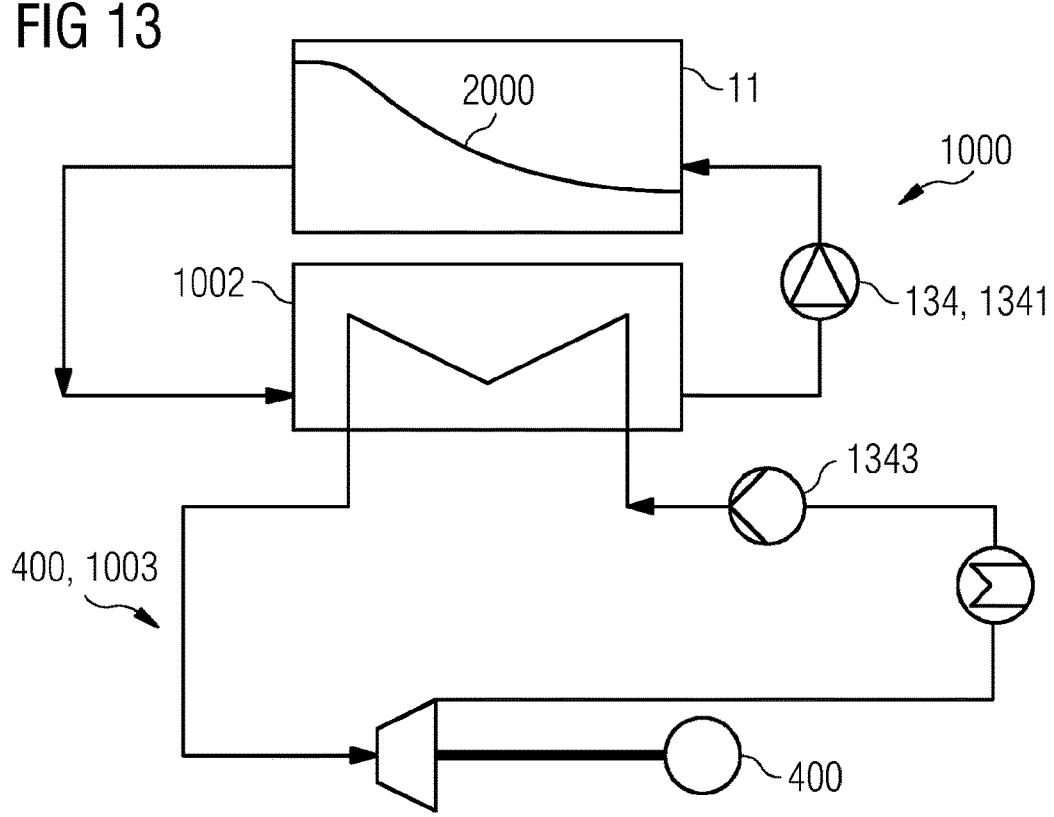

FIG. 8 shows an embodiment of a charging system;
FIG. 9 shows another embodiment of a charging system;
FIG. 10 shows another embodiment of a charging system;
FIG. 11 shows another embodiment of a charging system;
FIG. 12 shows another embodiment of a charging system; and
FIG. 13 shows an embodiment of a charging system.

DETAILED DESCRIPTION

Given is a charging system 1000 with a least one high temperature thermal energy exchange system 1 with a heat exchange chamber 11 on a high temperature level, which will be charged and discharged with thermal energy via a heat transfer fluid 13 which is then stored in the heat storage material 121.

The high temperature thermal energy exchange system 1 comprises a heat exchange chamber 11 on a high temperature level, which will be charged and discharged with thermal energy via a heat transfer fluid 13 and stored in the heat storage material 121.

The temperature level of the stored heat is significantly higher compared to methods applied so far to increase the efficiency. The temperature level lies between 300° C. and 800° C., preferably between 550° C. and 650° C. The thermal capacity of the high temperature heat exchange system lies in the range between 0.3 GWh and 100 GWh, which causes a thermal power of 50 MW.

The high temperature thermal energy exchange system 1 comprises at least one heat exchange chamber 11 with chamber boundaries 111 which surround at least one heat exchange chamber interior 112 of the heat exchange chamber 11. The heat exchange chamber is a horizontal heat exchange chamber 114.

The chamber boundaries 111 comprise at least one inlet opening 1111 for guiding in an inflow 132 of at least one heat transfer fluid 131 into the heat exchange chamber interior 112 and at least one outlet opening 1112 for guiding an outflow 133 of the heat transfer fluid out of the heat exchange chamber interior 112. At least one heat storage material 121 is arranged in the heat exchange chamber interior 112 such that a heat exchange flow 13 of the heat transfer fluid 131 through the heat exchange chamber interior 112 causes a heat exchange between the heat storage material 121 and the heat transfer fluid 131.

The heat exchange chamber is at least partly integrated in the earth. An alternative embodiment of the high temperature thermal energy exchange system comprises a completely integrated heat exchange chamber.

The charging system is equipped with at least one charging unit 200 for heating the heat transfer fluid 13 of the inflow 132.

The high temperature thermal energy exchange system 1 is equipped with a number of measuring devices 1500 for determining a charge status of the high temperature thermal energy exchange system 1. These measuring devices are distributed mainly in the heat exchange chamber 11.

The heat exchange chamber 11 is thermally insulated against the surrounding. There is a thermal insulation unit 300.

Figure 6A:
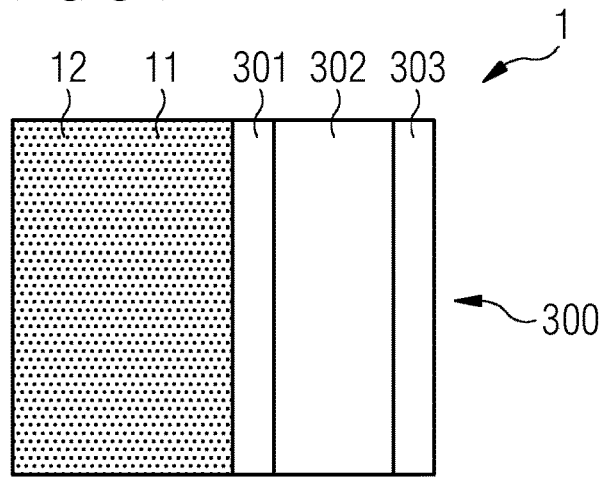
FIG. 6A shows an embodiment of a high temperature thermal energy exchange system with different thermal insulations of the heat exchange chamber.
Figure 6B:
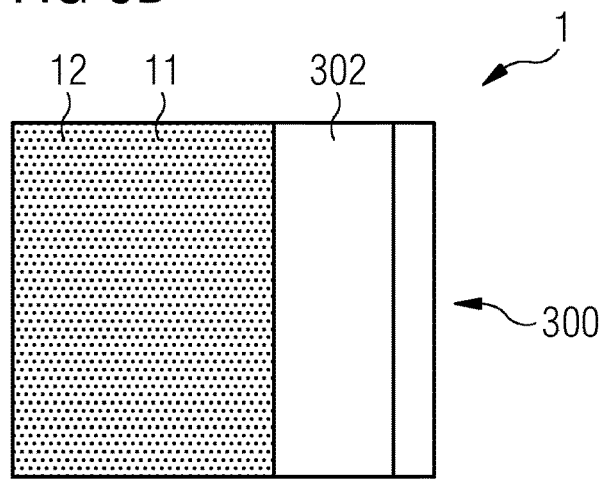
FIG. 6B shows another embodiment of a high temperature thermal energy exchange system with different thermal insulations of the heat exchange chamber.
Figure 6C:
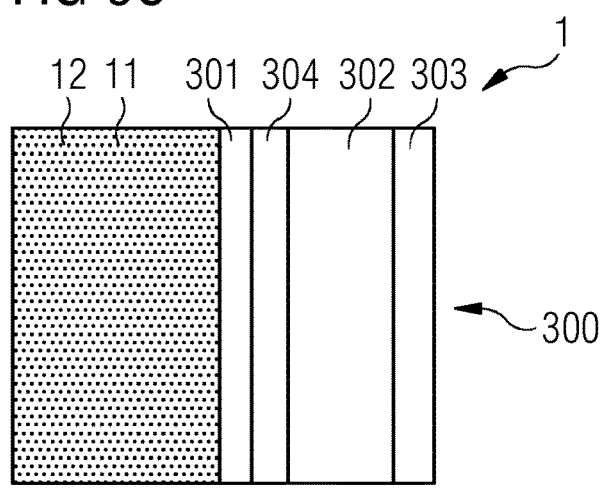
FIG. 6C shows another embodiment of a high temperature thermal energy exchange system with different thermal insulations of the heat exchange chamber.

Different thermal insulation possibilities (thermal insulation stacks) are shown in FIGS. 6A, 6B and 6C. Concerning FIG. 6A the insulation unit 300 comprises a first insulation cover sheet (layer) 301. This first insulation cover sheet comprises gas concrete, for instance Ytong®. Alternatively this first insulation cover sheet comprises bricks, clay, ceramics, clinker, concrete, plaster, fiber reinforced plaster, and/or metal.

The next insulation layer 302 comprises mineral wool and/or rock wool. Alternatively this insulation layer 302 comprises foamed clay or glass concrete. Mixtures of these materials are possible, too.

A third insulation layer 303 completes the insulation unit: This third insulation layer 303 has the function of a supporting structure and comprises gas concrete (for instance Ytong® or clay), clinker, concrete, plaster, fiber reinforced plaster and/or metal.

Alternatively, the first insulation layer 301 is omitted (FIG. 6B).

In a further alternative solution the thermal insulation unit 300 comprises an additional intermediate insulation cover layer 304 (FIG. 6C). This additional cover layer comprises gas concrete, clay or ceramics and has the function of an additional supporting structure.

Exemplarily, the length 118 of the horizontal heat exchange chamber 11 is about 200 m, the height 119 of the heat exchange chamber 11 is about 10 m and the width of the heat exchange chamber 11 is about 50 m.

Alternatively, a vertical heat exchange chamber 113 is used (FIGS. 2A and 2B). For instance, the height 120 of this vertical heat exchange chamber 113 is about 40 m, a width 119 about 20 m and a length of about 40 m.

Alternatively, cylindrically shaped heat exchange chambers 113 are used.

The proposed high temperature thermal energy exchange system will store energy on a high temperature level, which can be used during discharging to produce steam in a water steam cycle for reconversion into electrical energy. Therefore, one or several heat exchange chambers filled with solid heat storage material are used. The solid heat storage material could be bulk storages material with sand, stones or gravels, rubbles, splits, clinkers, ceramics, slag and other bulk materials, for example basalt or iron silicate slag.

The solid materials can be used alone or can be mixed with other heat storage materials (e.g. due to limited availability of materials, in order to improve the flow behavior of the heat exchange flow of the heat transfer fluid through the heat exchange chamber interior or in order to improve the heat exchange between the heat storage material and the heat transfer fluid) for the use in the high temperature thermal energy exchange system. Different particle sizes or mixture of different particle sizes (improving flow behavior and energy density) can be used, too. As a result, the filling of the heat exchange chamber with heat storage material can be homogenous or inhomogeneous.

Figure 1:
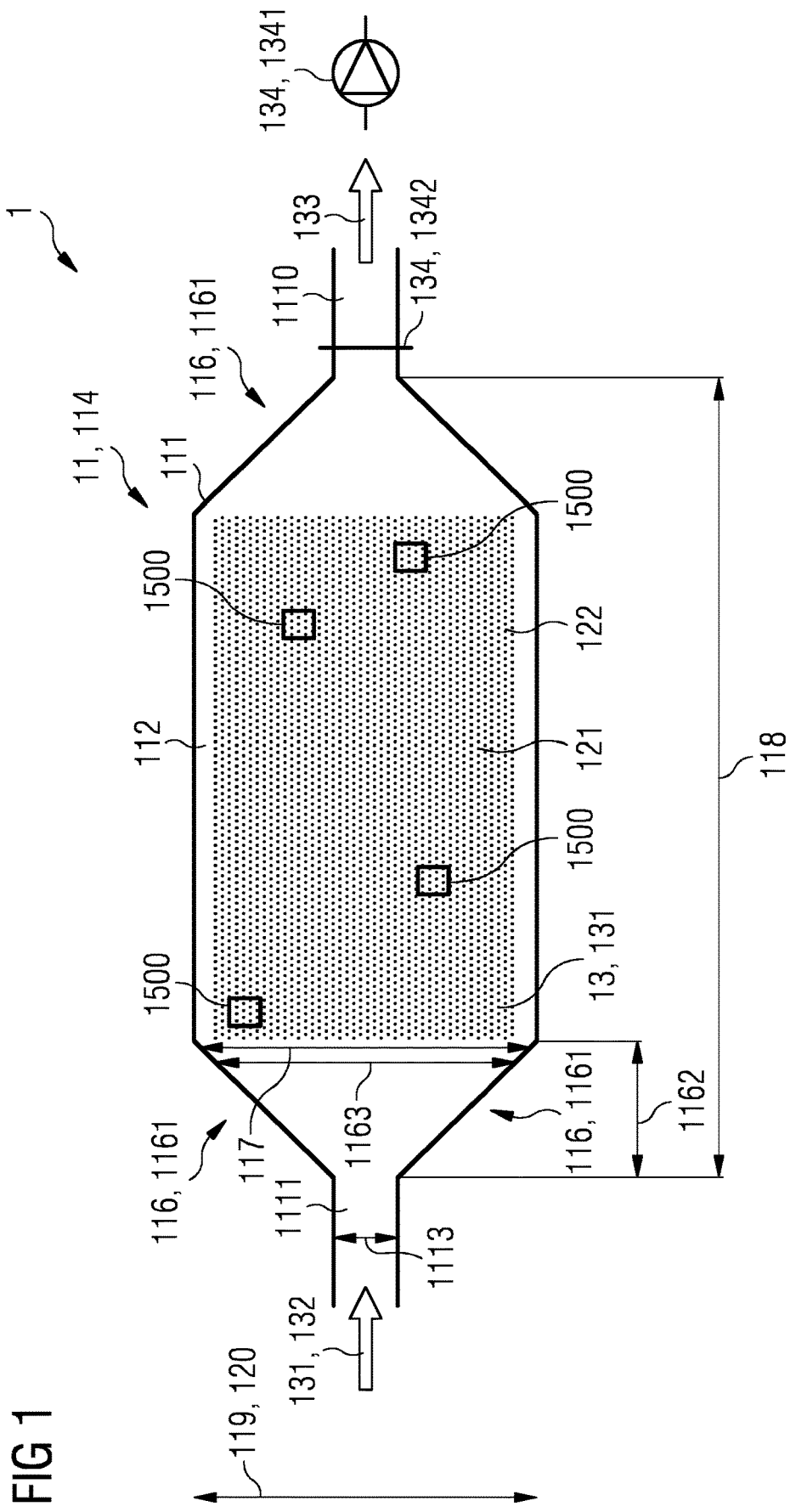
FIG. 1 shows an embodiment of a high temperature thermal energy exchange system.

This solid bulk material is heated up and stores the thermal energy over a long time period. The shape and the arrangement of one or several heat exchange chambers with the heat storage material are according to the usage and the integration in a certain system. The shape of the base area of the heat exchange chamber depends on whether the heat exchange chamber(s) will be built vertically (no negative effect of natural convection) or horizontally (simple construction and incident flow, adaption to local conditions) as shown in FIGS. 1 and 2A and 2B. The cross section of the heat exchange chamber will be a trapezoid, if the heat exchange chamber is horizontal).

In both cases (horizontal heat exchange chamber and vertical heat exchange chamber), there is a transition area 116 of the heat exchange chamber 11 with a tapering profile 1161. Thereby an opening diameter 1113 of the opening 1111 or 1112 aligns to a first tapering profile diameter 1162 of the tapering profile and a chamber diameter 117 of the heat exchange chamber 11 aligns to a second tapering profile diameter 1163 of the tapering profile (see FIG. 1, 2A, 2B, 5A or 5b). The inflow 132 of the heat transfer fluid 13 is guided into the heat exchange chamber interior 112. The guided inflow is distributed to a wide area of heat storage material 121. By this measure a capacity of the heat exchange unit (heat storage material 121 which is located in the heat exchange chamber 11) can be utilized in an advantageous manner.

The transition area 116 is short. The transition area 116 comprises dimension 1162 which is less than 50% of a heat exchange chamber length 118 of the heat exchange chamber 11. The short transition area 116 projects into the heat exchange chamber 11. The result is a short transition channel for the guiding of the inflow 132 into the heat exchange chamber interior 112 of the heat exchange chamber 11.

Figure 3:
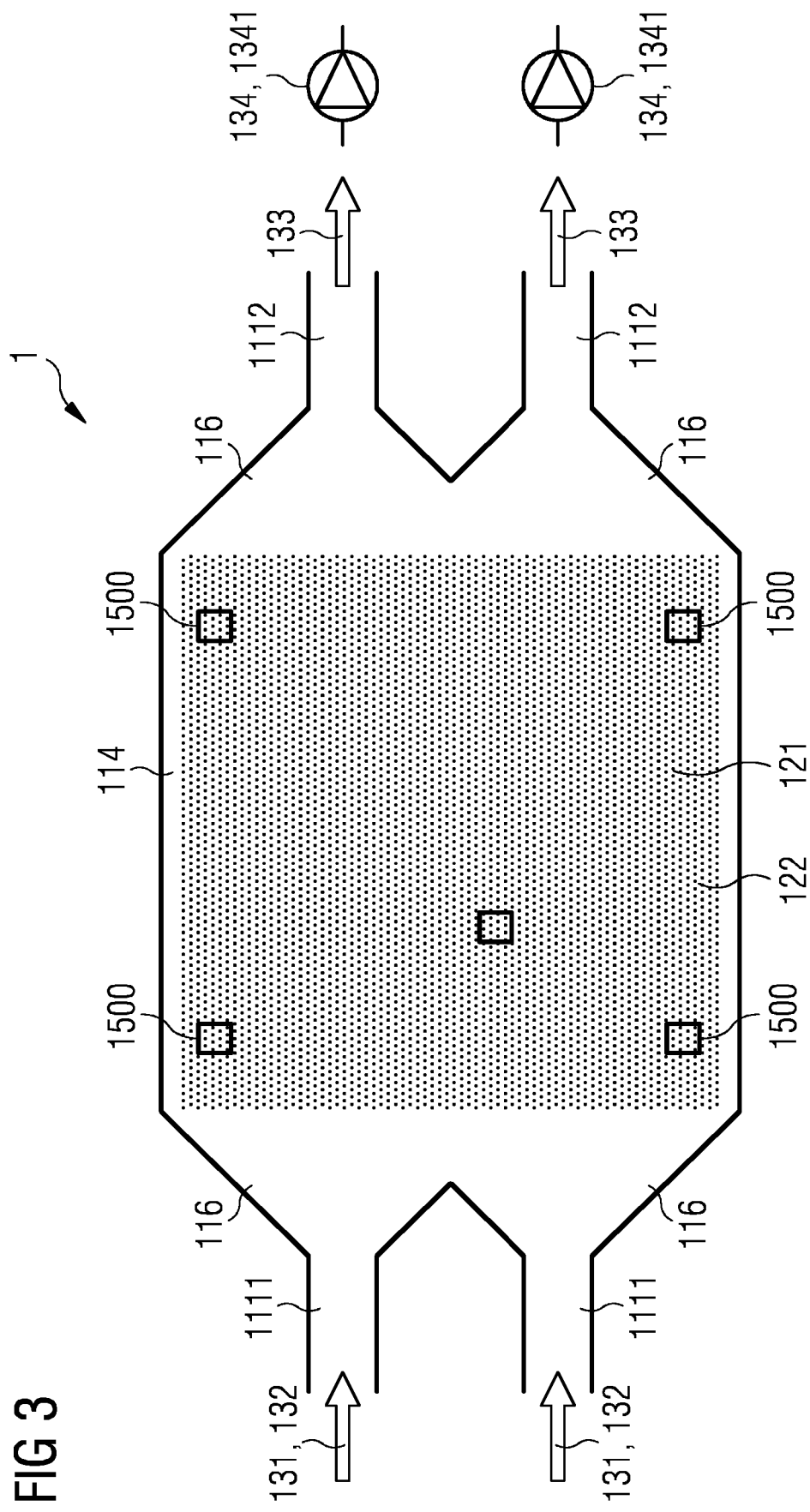
FIG. 3 shows an embodiment of a horizontal heat exchange chamber.
Figure 5A:
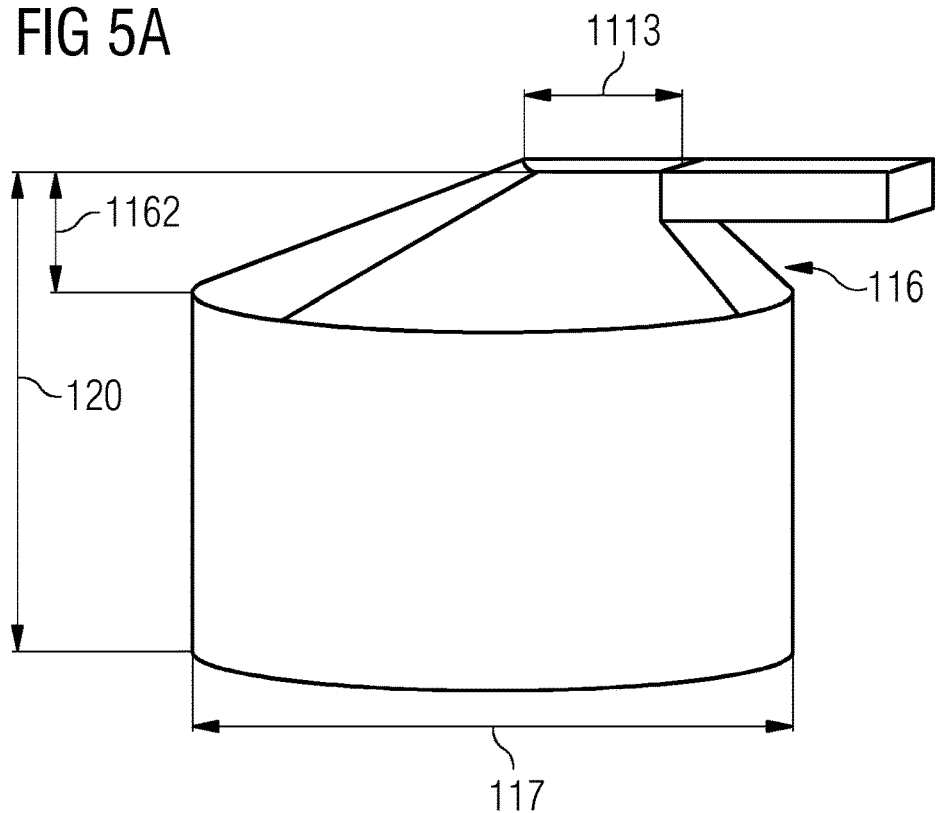
FIG. 5A shows an embodiment of a vertical heat exchange chamber.
Figure 5B:
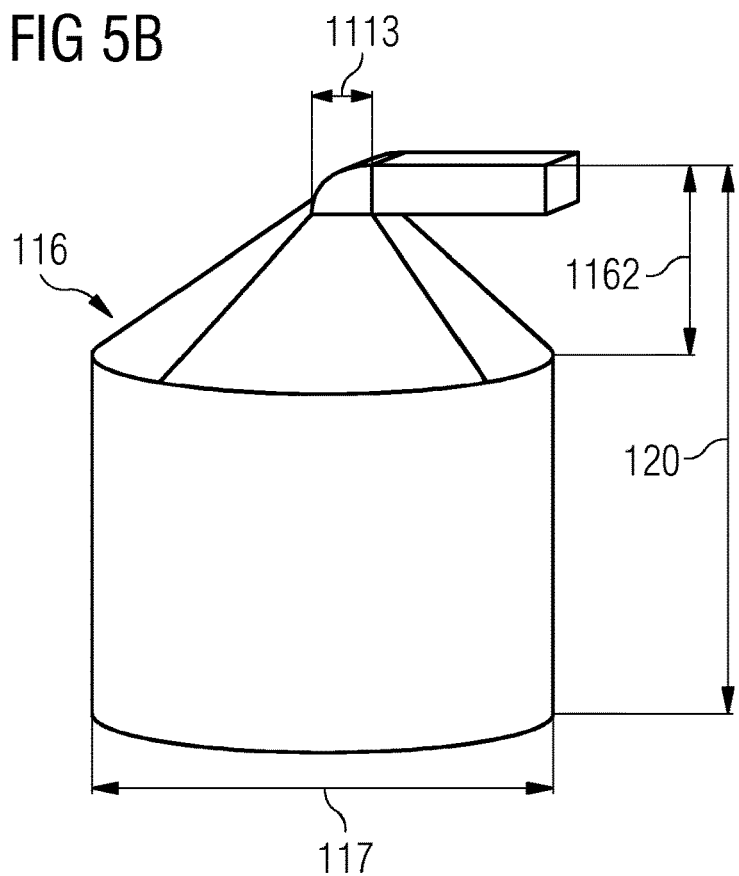
FIG. 5B shows an embodiment of a vertical heat exchange chamber.

In order to adapt the heat exchange flow 13 the high temperature thermal energy exchange system comprises a flow adjusting element 134. This flow adjusting element 134 is a blower Furthermore the heat exchange chamber 11 can comprise one or several inlet openings 1111 and outlet openings 1112 as shown in FIG. 3.

The high temperature thermal energy exchange system 1 is additionally equipped with at least one flow adjusting element 134. The flow adjusting element is an active fluid motion device (1341) like a blower or a pump. Such a device enables a transportation of the heat transfer fluid 131 through the heat exchange chamber interior 111 of the heat exchange chamber 11. The blower or the pump can be installed upstream or downstream of to the heat exchange chamber 11.

In addition, at least one passive fluid control 1342 device like a valve is located upstream or downstream of the heat exchange chamber 11.

For the charging mode the downstream installation (installation of the adjusting device at the cold end of the high temperature thermal energy exchange system) is advantageous: Relatively cold heat transfer fluid passes the flow adjusting device after releasing of heat to the heat storage material. In contrast to that, in a discharging mode the upstream installation of the flow adjusting device is advantageous: Relatively cold heat transfer fluid passes the flow adjusting element before absorbing heat from the heat storage material. For both modes, the flow adjusting element is located at the same position.

In case of vertical heat exchange chambers the inlet openings and outlet openings can be installed at the top and bottom (decreasing and avoiding natural convection). Horizontal heat exchange chambers can have inlet openings and outlet openings on top and bottom (decreasing natural convection) or sideways (simple and inexpensive construction and simple incident flow).

The heat transfer fluid 131 enters the heat exchange chamber 11 through a diffuser 1164. The diffuser 1164 comprises stones 1165 and is arranged at the transition area 116 of the heat exchange chamber 11.

Furthermore the heat transfer fluid 131 can be liquid or gaseous, which also can be organic or inorganic.

In order to guide the heat transfer fluid 131 shutters and/or valves (passive fluid control devices) are used.

FIG. 2A shows a vertical heat exchange chamber 113 in a discharging mode. The discharging mode direction 136 is oriented upwards.

FIG. 2B shows the vertical heat exchange chamber 113 of FIG. 2A in a charging mode. The charging mode direction 135 is directed downwards.

FIG. 3 shows a horizontal heat exchange chamber 114. Thereby two inlet openings 1111 are arranged above each other as well as two outlet openings 1112. These openings 1111 and 1112 are arranged at individual transition areas 1166 of the heat exchange chamber 11. At least every individual transition area 1166 of the inlet openings comprises a tapering profile. By means of the individual transition areas 1166, diffusers 1164 with stones 1165 are formed. For that, the transition areas are filled with stones up to a third. Again: Measuring devices 1500 for determining a charge status of the high temperature thermal energy exchange system are distributed in the heat exchange chamber 11.

Depending on the usage and the demands, the capacity of the high temperature heat exchange system can easily be adapted (heat storage material, dimensions of the heat exchange chamber, etc.). For instance, to increase the capacity of high temperature heat exchange system the high temperature heat exchange system is equipped with several heat exchange chambers as shown in FIG. 4.

Thereby the heat exchange chambers can be arranged in parallel, serially, in line, on top of each other and/or as single one. FIG. 4 show such an embodiment with a parallel arrangement: Three heat exchange chambers 11 form together a common storage unit of the high temperature thermal energy exchange system.

Figure 7:
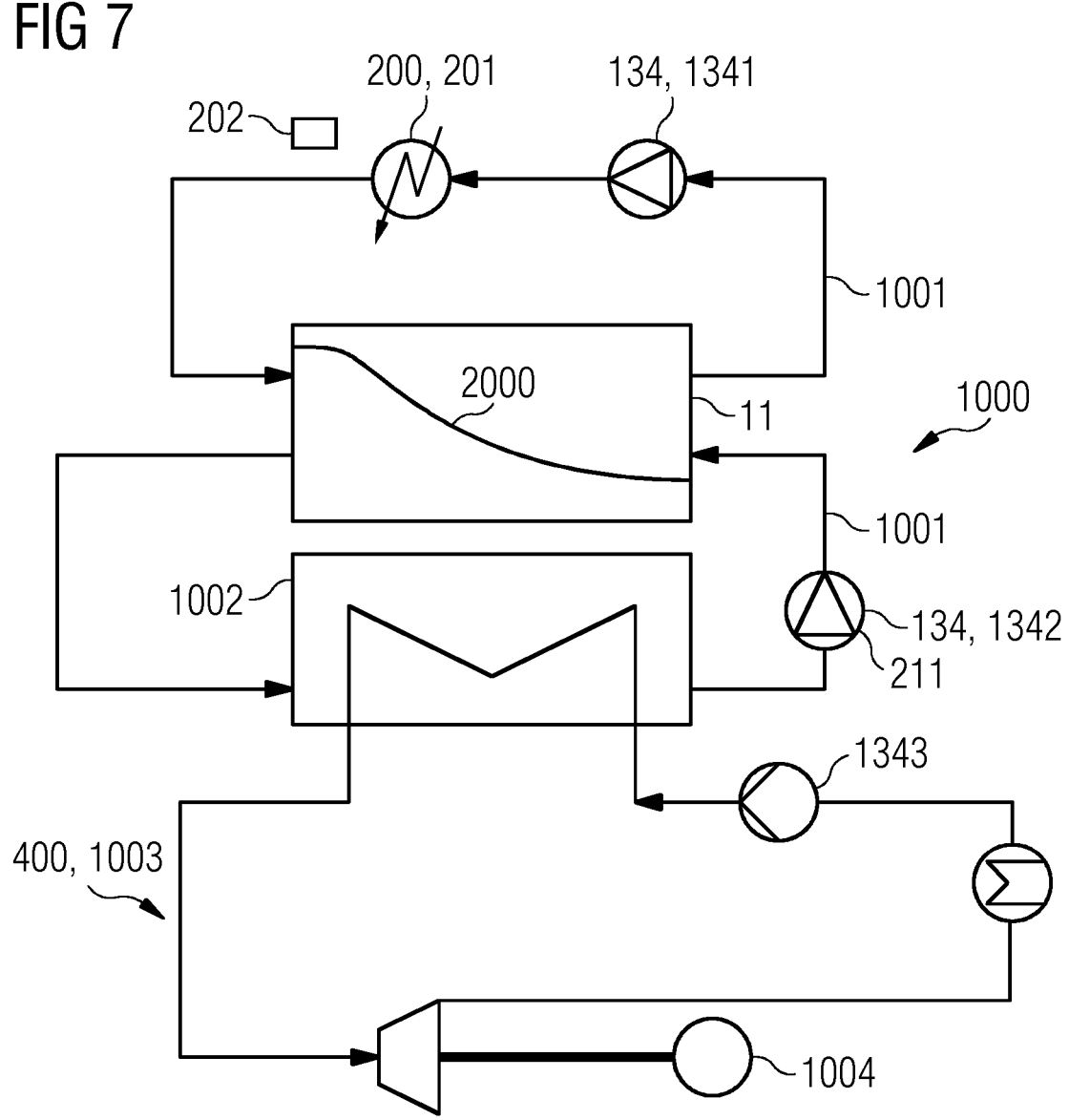
FIG. 7 shows an embodiment of a complete charging system with a high temperature thermal energy exchange system.

Referring to FIG. 7, the complete charging system 1000 for a high temperature thermal energy exchange system 1 comprises one or several electrical heating devices 201 (charging units 200), one or several machines to circulate the working fluid such as blowers 211 or pumps 1341 and one or several heat exchange chambers 11. The electrical heating devices 200 can be resistance heater 201, inductive heater or others. These devices are connected by a pipe or ducting system 1001. The high temperature thermal energy exchange system shown in FIG. 7 comprises a closed loop

1005. The control unit 202 for controlling the charging unit 201 is arranged outside the inflow of the heat transfer fluid.

For the charging mode, the heat transfer fluid 131 is heated up from ambient conditions by the electrical heater 201.

Alternatively, the heating (partial heating or complete heating) of the heat transfer fluid is carried out with the aid of waste heat e.g. from industrial or power plant processes or from geothermal sources with or without an electrical heating device.

This charged heat transfer fluid is guided into the heat exchange chamber interior 112 of the heat exchange chamber 11 for charging the heat storage material. Thereby the heat exchange between the heat transfer fluid and the heat storage material takes place. With reference 2000 the temperature front at a certain time of this charging process is shown.

The machine to circulate the heat transfer fluid 131 is preferably installed upstream or alternatively downstream of the electrical heating device or downstream of heat exchange chamber. Several heat exchange chambers 11 are combined for varying charge and discharge duration (not shown). Alternatively, just one heat exchange chamber 11 is used in order to cover the required storage capacity.

For the discharging mode the high temperature thermal energy exchange system comprises one or several heat exchange chambers 11 mentioned above, an active fluid motion control device 1341 to circulate the heat transfer fluid 131 and a thermal machine for re-electrification, which can be a water/steam cycle 1003. The working fluid of this cycle is water and steam. The water/steam cycle 1003 has the function of a discharging unit 400. With the aid of the heat exchange system (heat exchanger) 1002 thermal energy of the heat transfer fluid is transferred to the working fluid of the steam cycle 1002.

The different components of the high temperature heat exchange system 1 are connected with a pipe or ducting system 1001. The flow adjusting element guides the heat transfer fluid through the heat exchange chamber of the high temperature thermal energy exchange system, thermal energy is transferred from the heat storage material 121 to the heat transfer fluid 131 and is transported to the thermal machines or further applications e.g. district heating, pre-heating of the discharge cycle, heating of different components of the high temperature thermal energy exchange system etc. If the thermal machine is a water steam cycle, a steam generator, a heat exchanger or an evaporator, which consist of one or several units, the thermal energy is transferred to water to generate steam which is fed to a thermal engine to produce electrical power as shown in FIG. 7. If the working fluid downstream of this thermal machine still contains thermal energy at a temperature level higher than ambient, this energy can be stored in the same heat exchange chamber or in another heat exchange chamber.

The complete system with all components in charge and discharge cycle for the high temperature thermal energy exchange system is shown in FIG. 7.

In an energy system with high penetration of renewable energy the profitability of fossil fueled thermal power plants suffers from low operation hours. This can lead to a complete shutdown of such plants for economic reasons.

The units of the charging system are connected by a pipe or ducting system as shown in FIG. 9. Furthermore the heat transfer fluid is heated up from ambient conditions, is pre- or completely heated up with waste heat e.g. from industrial or power plant processes or from geothermal sources with or without an electrical heating device as shown in FIG. 12.

The machine to circulate the fluid is preferably installed upstream of the electrical heating device or alternatively downstream of the electrical heating device or downstream of the high temperature thermal energy exchange system, see FIGS. 10 and 11. Several high temperature thermal energy exchange systems with several heat exchange chambers are combined for varying charge and discharge duration. Alternatively one storage unit is solely used to cover the required storage capacity.

Furthermore the described charging system for the high temperature thermal energy exchange system can also be used in a closed charging cycle (closed loop). The heat transfer fluid that leaves the heat exchange chamber will be guided back into the electrical heating device (charging unit), so contamination of the heat transfer fluid for instance from particles in the ambient air and vice versa is avoided.

In addition thermal losses are reduced when fluid at a temperature higher than ambient temperature leaves the heat exchange chamber at the cold end. The heat transfer fluid 131 will be heated up in every cycle and does not need to be heated up from ambient conditions as shown in FIG. 13.

The charging cycle can comprise a particle filter or other means to remove particles from the heat transfer fluid. This serves the purpose of efficient heat transfer, avoid cloaking and possible fires.

The electrical heating device can be resistive or inductive heating, can have a power rating above 20 MW or above 100 MW, a temperature above 500° C., can be designed in one or several modules or in bulk. The heating coils could be either directly surrounded by the fluid or in heating cartridges.

The high temperature thermal energy exchange system comprises a heat exchange chamber with bulk material, which also can be a stone bed filled with solid material e.g. sand, gravel, rubble, split, clinker, slag etc., which can be basalt or slag.

The discharge cycle comprises one or several heat exchange chambers mentioned above, a flow machine to circulate the heat transfer fluid and a thermal machine for re-electrification, which can be a water steam cycle. The components are connected with a pipe or ducting system. The flow machine guides the heat transfer fluid through the heat exchange chamber, thermal energy is transferred from the heat storage material to the heat transfer fluid and transported to the thermal machine or further applications e.g. district heating etc. If the thermal machine is a water steam cycle, a steam generator, a heat exchanger or an evaporator, which consists of one or several units, transfer the thermal energy to water to generate steam which is fed to a thermal engine, such as a steam turbine with an electric generator coupled thereto, to produce electrical power as shown in FIG. 13. If the working fluid downstream of this thermal machine still contains thermal energy at a temperature level higher than ambient temperature, this energy can be stored in another high temperature thermal energy exchange system, which can comprise one or several heat exchange chambers with heat storage material. The remaining thermal energy can alternatively be used for other purposes such as district heating etc. In a closed discharge cycle, the exhausted gas which leaves the thermal machine will preferably be redirected into the heat exchange system 1002 again as shown in FIG. 12.

Following additional remarks:

FIG. 8 describes a system for providing thermal energy for the charging cycle of the high temperature thermal energy exchange system with the aid of a heat pump 203. With the aid of heat exchangers 210 and blowers 211 thermal energy is transported to the heat exchanger 2300. Via the heat exchanger 2300 heat is provided for heating the heat transfer fluid.

Looking at FIGS. 9 and 10, an electrical heating device 201 as charging unit 200 is used. In FIG. 9 the blower 1341 is located upstream of the electrical heater 200, whereas in FIG. 10 the blower is located downstream of the electrical heater. In both cases, the heated heat transfer fluid 131 is guided to the heat exchange chamber 11.

The example concerning FIGS. 9 and 10 refer to open loops. In contrast to that, FIG. 11 refers to a closed loop solution. In this exemplary embodiment the blower 1341 is located downstream of the heat exchange chamber 11. In addition, the heat transfer fluid 131 which passed the heat exchange chamber 11 is guided back to the electrical heater 200.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A charging system with a least one high temperature thermal energy exchange system, comprising:
  at least one heat exchange chamber, the at least one heat exchange chamber being a storage chamber with chamber boundaries that surround at least one chamber interior of the at least one heat exchange chamber, wherein the chamber boundaries comprise at least one inlet opening for guiding in an inflow of at least one heat transfer fluid into the at least one chamber interior and at least one outlet opening for guiding out an outflow of the at least one heat transfer fluid out of the at least one chamber interior;
  at least one heat storage material arranged in the at least one heat exchange chamber interior such that a heat exchange flow of the at least one heat transfer fluid through the at least one heat exchange chamber interior causes a heat exchange between the at least one heat storage material and the at least one heat transfer fluid; and
  at least one charging unit positioned outside of the at least one heat exchange chamber for continuously heating the at least one heat transfer fluid upstream of the at least one inlet opening in a charging mode, wherein at least one discharging unit positioned outside of the at least heat exchange chamber discharges the heat of the at least one heat transfer fluid in a discharging mode.

2. The charging system according to claim 1, further comprising at least one control unit for controlling the at least one charging unit, wherein the at least one control unit of the at least one charging unit is arranged outside the inflow of the at least one heat transfer fluid.

3. The charging system according to claim 1, wherein the at least one charging unit comprises a charging surface which is arranged in the inflow.

4. The charging system according to claim 3, wherein the charging surface is formed by a grid.

5. The charging system according to claim 1, further comprising a means for removing particles from the inflow.

6. The charging system according to claim 1, wherein heat exchange channels are embedded in the at least one heat storage material for guiding of the heat exchange flow through the at least one heat exchange chamber interior.

7. The charging system according to claim 1, wherein the high temperature thermal energy exchange system is equipped with at least one flow adjusting element for adjusting the heat exchange flow of the at least one heat transfer fluid through the at least one heat exchange chamber interior, the inflow of the at least one heat transfer fluid into the at least one heat exchange chamber interior and/or the outflow of the at least one heat transfer fluid out of the at least one heat exchange chamber interior.

8. The charging system according to claim 7, wherein the at least one flow adjusting element comprises at least one active fluid motion device which is selected from the group consisting of: a blower, a fan and a pump and/or the at least one flow adjusting element comprises at least one passive fluid control device which is selected from the group consisting of: an activatable bypass pipe, a nozzle, a flap and a valve.

9. The charging system according to claim 1, wherein the at least one heat exchange chamber is a vertical heat exchange chamber and/or a horizontal heat exchange chamber.

10. The charging system according to claim 1, wherein the chamber boundary with one of the openings comprises a transition area with a tapering profile such that an opening diameter of the openings aligns to a first tapering profile diameter of the tapering profile and a chamber diameter of the at least one heat exchange chamber aligns to a second tapering profile diameter of the tapering profile.

11. The charging system according to claim 1, wherein at least two inlet openings are arranged vertically to each other and/or at least two outlet openings are arranged vertically to each other.

12. The charging system according to claim 1, wherein the at least one heat storage material comprises at least one chemically and/or physically stable material.

13. The charging system according to claim 1, wherein the at least one heat storage material comprises sand and/or stones.

14. The charging system according to claim 1, wherein the at least one heat transfer fluid comprises a gas at ambient gas pressure.

15. The charging system according to claim 14, wherein the gas at the ambient pressure is air.

16. The charging system according to claim 1, wherein the at least one charging unit comprises at least one electrical heating device which is selected from the group consisting of: a resistance heater, an inductive heater, an emitter of electromagnetic radiation and a heat pump.

17. The charging system according to claim 1, which is equipped with at least one measuring device for determining a charge status of the high temperature thermal energy exchange system.

18. A power plant according to claim 1, wherein a closed loop is implemented and wherein the inflow comprises the outflow.

19. A method for charging the high temperature thermal energy exchange system of the charging system according to claim 1 with thermal energy, wherein in a charging mode of the high temperature thermal energy exchange system a heat exchange flow of the at least one heat transfer fluid is guided through the at least one charging unit and then through the at least one heat exchange chamber interior, whereby a charging of the at least one heat storage material with thermal energy is caused.

20. The method according to claim 19, wherein an operating temperature of the operating mode is selected from the range between 300° C. and 1000° C.

21. A charging system with a least one high temperature thermal energy exchange system, comprising:
- at least one heat exchange chamber with chamber boundaries that surround at least one chamber interior of the at least one heat exchange chamber, wherein the chamber boundaries comprise at least one inlet opening for guiding in an inflow of at least one heat transfer fluid into the at least one chamber interior and at least one outlet opening for guiding out an outflow of the at least one heat transfer fluid out of the at least one chamber interior;
- at least one heat storage material arranged in the at least one heat exchange chamber interior such that a heat exchange flow of the at least one heat transfer fluid through the at least one heat exchange chamber interior causes a heat exchange between the at least one heat storage material and the at least one heat transfer fluid; and
- at least one charging unit for heating the at least one heat transfer fluid of the inflow;
- wherein the chamber boundary with one of the openings comprises a transition area with a tapering profile such that an opening diameter of the openings aligns to a first tapering profile diameter of the tapering profile and a chamber diameter of the at least one heat exchange chamber aligns to a second tapering profile diameter of the tapering profile.

22. A charging system with a least one high temperature thermal energy exchange system, comprising:
- at least one heat exchange chamber with chamber boundaries that surround at least one chamber interior of the at least one heat exchange chamber, wherein the chamber boundaries comprise at least one inlet opening for guiding in an inflow of at least one heat transfer fluid into the at least one chamber interior and at least one outlet opening for guiding out an outflow of the at least one heat transfer fluid out of the at least one chamber interior;
- at least one heat storage material arranged in the at least one heat exchange chamber interior such that a heat exchange flow of the at least one heat transfer fluid through the at least one heat exchange chamber interior causes a heat exchange between the at least one heat storage material and the at least one heat transfer fluid; and
- at least one charging unit for continuously heating the at least one heat transfer fluid upstream of the at least one inlet opening in a charging mode, wherein at least one discharging unit discharges the heat of the at least one heat transfer fluid in a discharging mode;
- wherein the at least one high temperature thermal energy exchange system is integrated with an existing power plant.

23. The charging system of claim 22, wherein the at least one high temperature thermal energy exchange system is integrated with the existing power plant to generate electrical energy with the stored thermal energy in the discharging mode.

24. The charging system of claim 22, wherein the existing power plant is at least one of a combined cycle power plant.

* * * * *